United States Patent
Wijnands et al.

(10) Patent No.: US 9,769,068 B2
(45) Date of Patent: Sep. 19, 2017

(54) VIRTUAL LDP SESSION

(71) Applicant: Cisco Technology, Inc., San Jose, CA (US)

(72) Inventors: Ijsbrand Wijnands, Leuven (BE); Nagendra Kumar, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 372 days.

(21) Appl. No.: 14/040,989

(22) Filed: Sep. 30, 2013

(65) Prior Publication Data
US 2015/0092776 A1  Apr. 2, 2015

(51) Int. Cl.
*H04L 12/28* (2006.01)
*H04L 12/723* (2013.01)
*H04L 12/721* (2013.01)

(52) U.S. Cl.
CPC ............ *H04L 45/507* (2013.01); *H04L 45/36* (2013.01)

(58) Field of Classification Search
CPC ... H04L 45/50; H04L 12/4641; H04L 45/507; H04L 45/00; H04L 45/68; H04L 63/0272; H04L 45/22; H04L 45/04
USPC .......................... 370/392, 254, 225, 395.53
See application file for complete search history.

(56) References Cited

U.S. PATENT DOCUMENTS

| | | | |
|---|---|---|---|
| 2006/0182122 A1* | 8/2006 | Davie | H04L 12/2854 370/395.53 |
| 2006/0198321 A1 | 9/2006 | Nadeau et al. | 370/254 |
| 2007/0248091 A1* | 10/2007 | Khalid | H04L 63/0272 370/392 |
| 2010/0302973 A1* | 12/2010 | Lange | H04L 12/4641 370/254 |
| 2011/0096780 A1* | 4/2011 | Darwish | H04L 45/507 370/392 |
| 2011/0164617 A1* | 7/2011 | Yong | H04L 45/04 370/392 |
| 2013/0208582 A1 | 8/2013 | Wijnands et al. | 370/218 |
| 2013/0266012 A1* | 10/2013 | Dutta | H04L 45/28 370/392 |

(Continued)

OTHER PUBLICATIONS

Rosen et al. Multiprotocol Label Switching Architecture RFC 3031 Jan. 2001.*

(Continued)

*Primary Examiner* — Wei Zhao
*Assistant Examiner* — Lionel Preval
(74) *Attorney, Agent, or Firm* — Campbell Stephenson LLP

(57) ABSTRACT

A receiving node receives a virtual LDP initialization (vInit) message from a first node, where the vInit message comprises a request to establish a vLDP session between a requesting node and a target node. If the receiving node does not own a destination address of the vInit message, the receiving node is determined to be a relay node. The relay node inserts a relay label into the vInit message, where the relay label is an outgoing label that the relay node uses to reach the first node, and forwards the vInit message toward the destination address. If the receiving node owns the destination address, the receiving node is determined to be the target node, which extracts a stack of relay labels from the vInit message. The relay labels are used to define a return path to the requesting node for messages transmitted over the vLDP session.

21 Claims, 11 Drawing Sheets

(56) References Cited

U.S. PATENT DOCUMENTS

2014/0219135 A1* 8/2014 Li ............................ H04L 41/12
370/254
2014/0355419 A1* 12/2014 Pillai ................... H04L 41/0654
370/225

OTHER PUBLICATIONS

"Label Distribution Operations," In: U. Black: "MPLS and Label Switching Networks," 2002, Prentice Hall PTR, XP002734504, ISBN: 0-13-035819-3, pp. 102-137.

IJ Wijnands, et al., "mLDP Node Protection," draft-wijnands-mpls-mldp-node-protection-00; Network Working Group, Internet Draft, IETF Trust, Copyright © 2012, pp. 1-17.

IJ Wijnands, et al., "Using Multipoint LDP When the Backbone Has No Route to the Root," RFC 6512, Copyright © 2012, pp. 1-12.

* cited by examiner

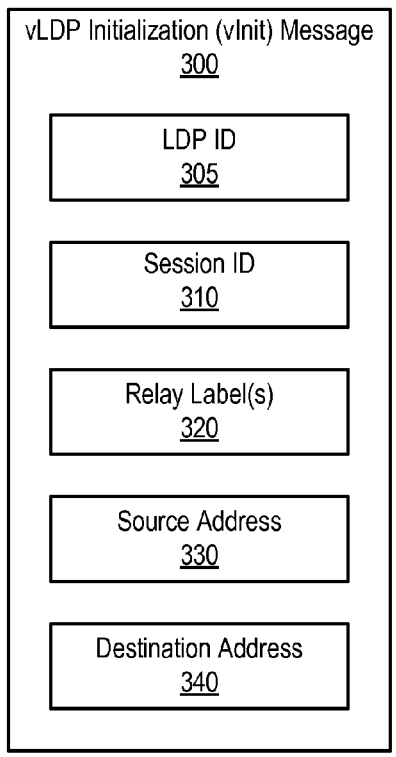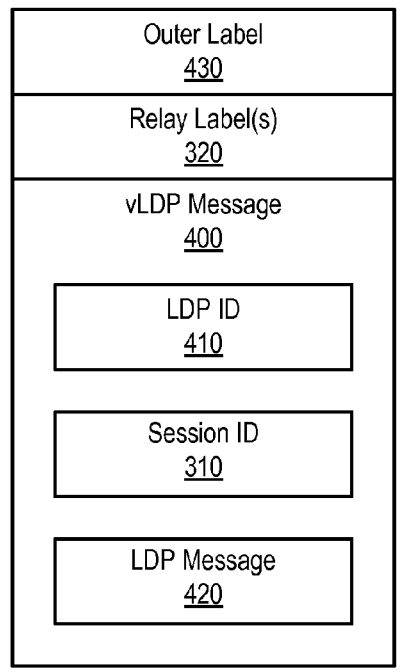
*FIG. 3A*
*FIG. 4*
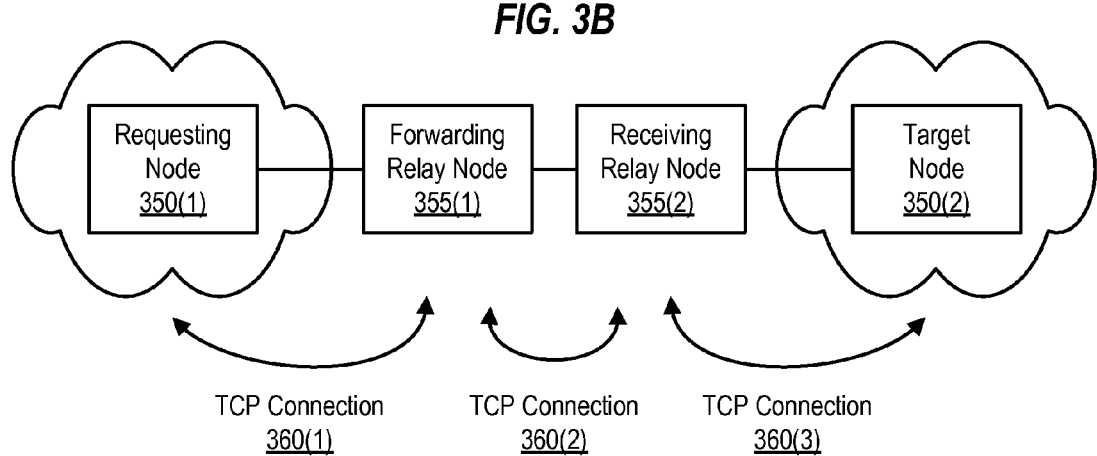
*FIG. 3B*

VIRTUAL LDP SESSION

TECHNICAL FIELD

The present disclosure relates generally to MPLS (multiprotocol label switching) protocols and, more particularly, to establishing a virtual LDP session between nodes that do not have IP (Internet Protocol) reachability.

BACKGROUND

Businesses employ networks to interconnect their computers, servers, storage devices, and other network elements. As a business grows, so can its network, increasing the number of network elements coupled to the network, the number of network links, and also geographic diversity. A business' network elements can be scattered throughout a city, a state, a country, or the world. Many businesses establish connectivity between network elements at disparate geographic sites using various intermediate networked areas or domains, such as a third party provider's network. Transmission paths may be established through the various intermediate networked domains using different communication protocols. Depending on the communication protocols implemented inside and outside of the networked domains, some routing information may not be available at a given network node.

BRIEF DESCRIPTION OF THE DRAWINGS

A more complete understanding of the present disclosure may be acquired by referring to the following description and accompanying drawings, in which like references numbers indicate like features.

FIG. 3A is a block diagram illustrating components of an example virtual LDP initialization (vInit) message, according to one embodiment.

FIG. 3B is a block diagram illustrating components of an example transmission path of a vInit message from a requesting node to a target node via two relay nodes, according to one embodiment.

FIG. 4 is a block diagram illustrating components of an example vLDP message, according to one embodiment.

Figure 1:
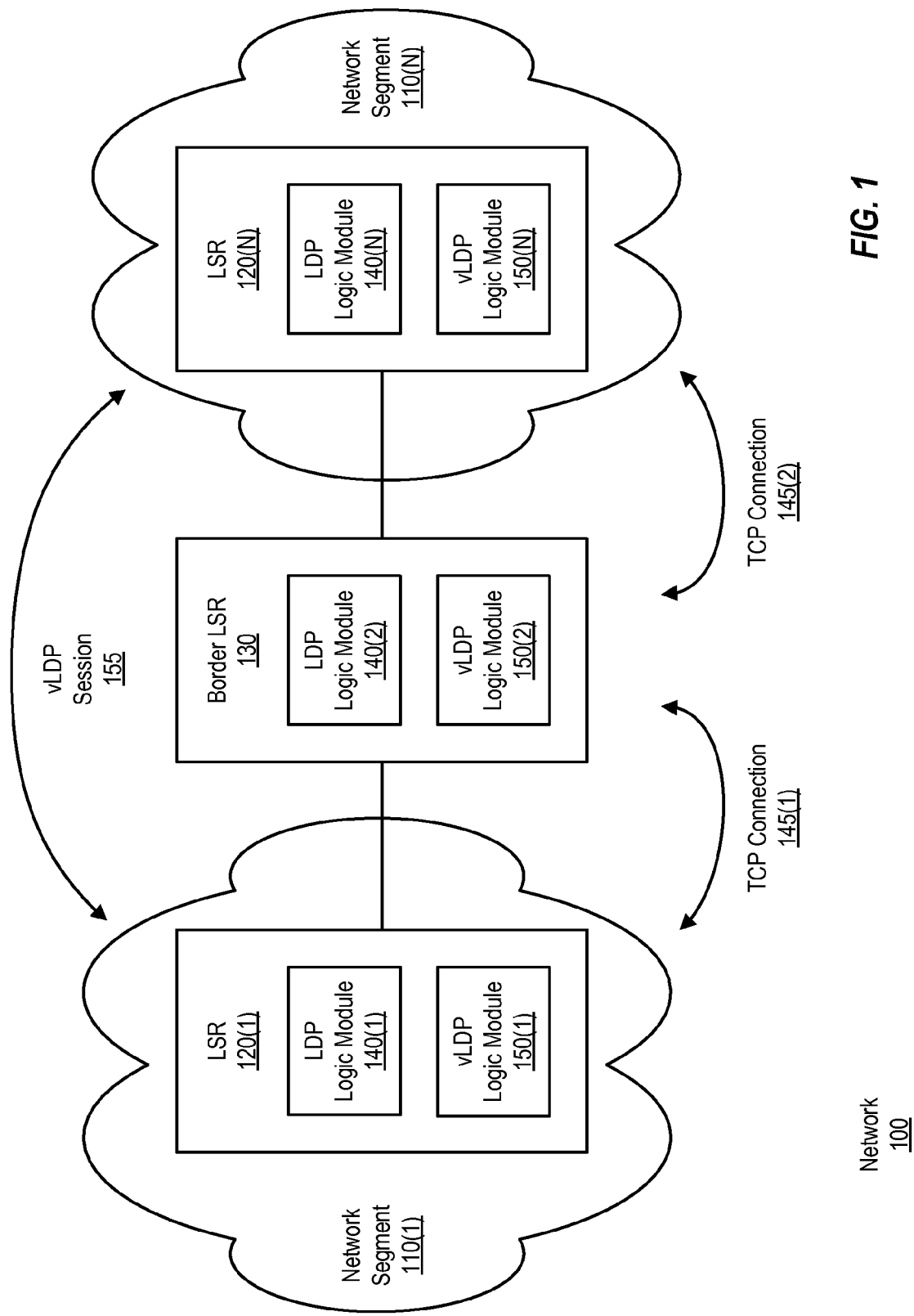
FIG. 1 is a block diagram illustrating components of an example network in which the present disclosure can be implemented, according to one embodiment.

While the present disclosure is susceptible to various modifications and alternative forms, specific embodiments of the present disclosure are provided as examples in the drawings and detailed description. It should be understood that the drawings and detailed description are not intended to limit the present disclosure to the particular form disclosed. Instead, the intention is to cover all modifications, equivalents and alternative falling within the spirit and scope of the present disclosure as defined by the appended claims.

DETAILED DESCRIPTION

Overview

A receiving node receives a virtual LDP initialization (vInit) message from a first node, where the vInit message comprises a request to establish a vLDP session between a requesting node and a target node. If the receiving node does not own a destination address of the vInit message, the receiving node is determined to be a relay node. The relay node inserts a relay label into the vInit message, where the relay label is an outgoing label that the relay node uses to reach the first node, and forwards the vInit message toward the destination address. If the receiving node owns the destination address, the receiving node is determined to be the target node, which extracts a stack of relay labels from the vInit message. The relay labels are used to define a return path to the requesting node for messages transmitted over the vLDP session.

Example Embodiments

FIG. 1 is a block diagram illustrating components of an example network 100 in which the present disclosure can be implemented. Network 100 includes a number of network segments 110(1)-(N) that implement MPLS (multiprotocol label switching) and a number of label switching routing elements 120(1)-(N). Network 100 can also implement Inter-AS (Autonomous System) VPN (Virtual Private Network) and Seamless/Unified MPLS. Examples of a network segment 110 include an autonomous system (AS), a customer network, a service provider network, a customer carrier network, a backbone network, a transport network, a core network, a network, a sub-network, an aggregate domain, a core domain, an access domain, a networked area, and/or a routing domain.

Each network segment includes a set of label switching routing elements 120 (also referred to as LSRs or nodes). Each LSR 120 is configured to implement a routing protocol (e.g., an interior routing protocol, such as IGP (Interior Gateway Protocol), OSPF (Open Shortest Path First), IS-IS (Intermediate System to Intermediate System), EIGRP (Enhanced Interior Gateway Routing Protocol), and the like). Each LSR 120 is configured to exchange routing information with other LSRs within the same network segment and store the routing information in a local IP (Internet Protocol) routing table, which includes routes to various destinations in the network segment (also referred to as routes interior to a network segment, or more simply as interior routes). A destination with a route stored in the local IP routing table is referred to as being IP (or unicast) reachable (e.g., the known route reaches the destination). As illustrated, LSR 120(1) is located in network segment 110(1) and exchanges routing information with other LSRs within network segment 110(1), and LSR 120(N) is located in network segment 110(N) and exchanges routing information with other LSRs within network segment 110(N). However, LSRs within a network segment will likely not have any routing information for a destination outside of the network segment. Such an outside destination is referred to as being IP (or unicast) unreachable (e.g., there is no known route stored in the local IP routing table that reaches the outside destination). For example, LSR 120(1) is IP unreachable for LSR 120(N). In other words, the IP address of LSR 120(1) is private to network segment 110(1) since the route to such an IP address is not distributed outside of network segment 110(1). Similarly, LSR 120(N) is IP unreachable for LSR 120(1). Since LSR 120(1) and LSR 120(N) are IP unreachable (e.g., do not have routes to one another), LSRs 120(1) and 120(N) do not have IP connectivity with one another.

Network segments 110(1)-(N) are coupled via a number of border LSRs and edge LSRs. As illustrated, border LSR 130 is connected to edge LSR 120(1) of network segment 110(1) and to edge LSR 120(N) of network segment 110(N). An example border LSR 130 is an area border router (or ABR, such as in a Seamless/Unified MPLS) and an autonomous system boundary router (ASBR, such as in an Inter-AS scenario). Edge LSRs are located at the edge of a network segment. Border LSRs and edge LSRs are configured to implement a routing protocol (as discussed above) and a reachability protocol (e.g., an exterior routing protocol or network reachability protocol, such as BGP (Border Gateway Protocol, also referred to as eBGP (exterior BGP)), and the like). Each BGP peer (e.g., border LSRs and edge LSRs in network 100) is configured to exchange reachability information with other BGP peers. A border LSR and/or edge LSR is configured to store the reachability information (e.g., in a local BGP routing table and/or IP routing table), which includes routes to the various network segments in the network (also referred to as routes exterior to a network segment, or more simply as exterior routes). The exterior routes to the various network segments are shared with other BGP peers, while the core LSRs (or LSRs located within the interior of a network segment) do not receive such exterior routes.

A label switched path (LSP) can be established in network 100, which is defined by a set of labels. Labels are short, fixed length, locally significant identifiers that are used to identify a Forwarding Equivalence Class (FEC). An FEC represents packets that share a same requirement for transport (e.g., over the same path with the same forwarding treatment). Each LSP is associated with at least one FEC that specifies which packets are mapped to that LSP. In order to build an LSP, each LSR is configured to exchange labels with one another using a label distribution protocol, such as LDP (Label Distribution Protocol) and/or multipoint extension to LDP (mLDP). The LDP protocol logic is illustrated as LDP logic module 140, implemented on LSRs 120(1)-(N) and border LSR 130. A given LSR binds a label to each destination in the LSR's local routing tables, and distributes this label binding to its peers (e.g., labels for interior routes are exchanged among LSRs (such as LDP peers) in the same network segment and labels for exterior routes are exchanged with edge LSRs and border LSRs (such as BGP peers) of one or more network segments). Each LSR stores the labels in a label information base (LIB) and/or a label forwarding information base (LFIB) and uses the labels to forward (or label switch) a packet along an LSP toward the packet's destination.

A pair of directly connected LSRs (e.g., one LSR is one hop away from the other LSR, also referred to as a next hop neighbor) can establish an LDP session to exchange labels with one another. The pair of LSRs (or end nodes) establishes an underlying TCP (Transmission Control Protocol) connection, which is used to set up the LDP session (e.g., negotiate LDP session parameters). The LDP session runs over the TCP connection. To establish the TCP connection, the pair of LSRs must have IP connectivity with one another (or each LSR has a route to the IP address for the other LSR). As illustrated, LSR 120(1) and border LSR 130 have IP connectivity with each other and have established a TCP connection 145(1), over which an LDP session can be established. Similarly, LSR 120(N) and border LSR 130 also have IP connectivity with each other and have established another TCP connection 145(2), over which another LDP session can be established.

A pair of LSRs (or end nodes) that are not directly connected (e.g., one LSR is more than one hop away from the other LSR, also referred to as a remote neighbor) can establish a targeted LDP session to exchange labels with one another. A targeted LDP session also runs over a TCP connection between the pair of LSRs. To establish a targeted LDP session, the pair of LSRs must also have IP connectivity with one another (e.g., in order to establish a TCP connection from one LSR to the other LSR). As illustrated, LSR 120(1) and LSR 120(N) do not have IP connectivity to one another because LSR 120(1) and LSR 120(N) are located in different network segments 110 that have limited routing information (e.g., LSR 120(1) does not have a route to LSR 120(N), and LSR 120(N) does not have a route to LSR 120(1)). Without IP connectivity, a TCP connection (and thus a targeted LDP session) cannot be established between LSR 120(1) and LSR 120(N). Additionally, there is no existing LSP that connects LSR 120(1) and LSR 120(N).

The present disclosure provides for a virtual LDP session that can be set up between a pair of edge LSRs that are not directly connected (e.g., that are remotely located from one another) and do not have IP connectivity with one another. As discussed above, TCP connections are established by LDP protocol logic while setting up LDP sessions with LDP neighbors. The present disclosure provides a lightweight extension to LDP protocol logic to establish a virtual LDP (vLDP) session over the existing TCP connections that couple the pair of edge LSRs via one or more relay nodes. Once established, the edge LSRs treat the vLDP session as a normal LDP session and each edge LSR treats the other edge LSR as a normal LDP neighbor (e.g., each LSR views the other edge LSR as if the other edge LSR were directly connected). Thus, the vLDP session provides a virtual LDP neighborship between the pair of edge LSRs, where LDP messages can be encapsulated or otherwise identified as vLDP messages, exchanged over the vLDP session, decapsulated, and processed by LDP protocol logic. A vLDP session can be used in unicast and multicast implementations.

Using the example illustrated in FIG. 1, a vLDP session 155 is established from first edge LSR 120(1) to second edge LSR 120(N) over existing TCP connections 145(1) and 145(2). In other words, a direct TCP connection from LSR 120(1) to LSR 120(N) can be "stitched" together at one or more relay nodes (e.g., border LSR 130), over which a vLDP session can be established. In one embodiment, while LDP state (e.g., FEC state, LDP bindings, and/or mLDP forwarding state) is maintained at the pair of edge LSRs, the one or more relay nodes need not store LDP state. In another embodiment, some reliability state can be maintained at the one or more relay nodes when an end-to-end reliability feature is implemented (further discussed below in connection with FIG. 4). LDP protocol logic is illustrated as LDP logic module 140 and vLDP extension to LDP protocol logic is illustrated as vLDP logic module 150. These components are further discussed below in connection with FIG. 2.

The present disclosure also provides for a virtual LDP initialization (vInit) message that is forwarded across the one or more relay nodes to collect one or more relay labels, which are used to label switch vLDP messages from one edge LSR to the other edge LSR. The one or more relay nodes act as passthrough nodes, without needing to store any LSP-specific information (e.g., need not store LDP state) at the one or more relay nodes. A vLDP session is especially helpful in mLDP node protection when a targeted LDP session cannot be established between the Merge Point (MPT) and Point of Local Repair (PLR), as further discussed below in connection with FIG. 6. While a vLDP session can be implemented to replace a targeted LDP, a vLDP session can (optionally) be established over a targeted LDP session, as further discussed below in connection with FIG. 4.

The vLDP session leverages existing security features implemented by the existing TCP connections as vLDP messages are conveyed over the existing TCP connections. Thus, label mapping messages can be exchanged over the vLDP session in a reliable and secured manner between nodes that do not have reachability. The vLDP session also provides a mechanism to exchange labels between nodes in different network segments without needing to leak reachability information (where such leaking would require very careful design that may not be scalable, or may destroy the intention of unified/seamless MPLS).

Network 100 can utilize Ethernet, IEEE 802.11x, or some other communications protocol. In light of the present disclosure, it will be appreciated that network 100 can include other components such as routers, firewalls and the like that are not germane to the discussion of the present disclosure and will not be discussed further herein. It will also be appreciated that other configurations are possible. For example, a much larger number of network segments 110(1)-(N), and/or LSRs 120(1)-(N) than the number shown can be implemented in the network, and so on.

The letter N is used to indicate a variable number of devices or components. For example, a variable number of network segments 110(1)-(N) and LSRs 120(1)-(N) are implemented in the network. Although the letter N is used in describing a variable number of instances of each of these different devices and components, a repeated use of the letter N does not necessarily indicate that each device and component has a same number of N instances implemented in the network.

Figure 2:
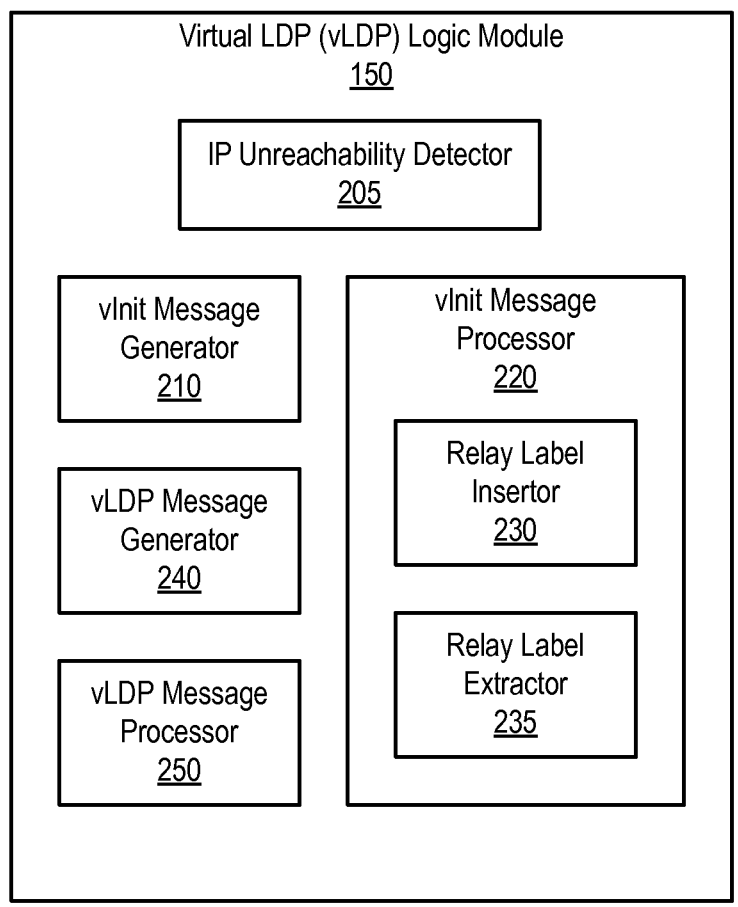
FIG. 2 is a block diagram illustrating components of an example virtual LDP (vLDP) logic module in which the present disclosure can be implemented, according to one embodiment.

FIG. 2 is a block diagram illustrating components of an example virtual LDP (vLDP) logic module 150 in which the present disclosure can be implemented. vLDP logic module 150 is configured to be implemented on an LSR or node (e.g., LSR 120 or border LSR 130) and is configured to communicate with an existing LDP logic module 140 that is also implemented on the node. vLDP logic module 150 includes an IP unreachability detector 205, a virtual LDP initialization (vInit) message generator 210, a vInit message processor 220, a vLDP message generator 240, and vLDP message processor 250. vInit message processor 220 also includes a relay label insertor 230 and a relay label extractor 235. Each component is further discussed below.

IP unreachability detector 205 is configured to discover a target node and detect if the target node is IP unreachable. In other words, IP unreachability detector 205 is configured to determine that a targeted LDP session cannot be established between the node (acting as a requesting node) and the target node.

IP unreachability detector 205 is configured to use a discovery mechanism to discover the target node's address (and thus also discover the target node). For example, IP unreachability detector can receive the address of the target node from a directly connected node (e.g., from a relay node, such as a protected node during mLDP node protection, as further discussed below in connection with FIG. 6), or the address of the target node can be manually configured at the requesting node. IP unreachability detector can consult an IP routing table at the requesting node and determine that the address of the target node is IP unreachable (e.g., determine whether the requesting node has a known route for the target node's address).

IP unreachability detector 205 is also configured to use a discovery mechanism to discover one or more relay nodes. For example, IP unreachability detector can discover directly connected relay nodes while the requesting node exchanges LDP hello messages with other directly connected nodes. Also, IP unreachability detector 205 can be configured to consult a BGP table and/or other routing tables at the requesting node to determine an access point (e.g., a border LSR) that reaches the target node (e.g., be IP reachable with the target node) and/or to determine a directly connected IP reachable relay node that is the next hop toward the target node (or access point). Additionally, an address of a relay node can be manually configured at the requesting node.

vInit message generator 210 is configured to generate a virtual LDP initialization (vInit) message and transmit the vInit message toward a destination, such as a target node. An example vInit message is further discussed in connection with FIG. 3A, where the vInit message is used to gather labels during initialization of the vLDP session. An example transmission path of a vInit message is further discussed in connection with FIG. 3B. In one embodiment, a vInit message is a newly defined initialization message. In another embodiment, a vInit message is an LDP initialization message that is identified as a vInit message, where the LDP initialization message includes optional vInit parameters. The LDP initialization message that is identified as a vInit message is defined by LDP protocol logic.

vInit message processor 220 is configured to receive and process a vInit message. vInit message process also includes a relay label insertor 230 that is configured to insert a relay label into a received vInit message, and a relay label extractor 235 that is configured to extract a relay label from a received vInit message. If the node (on which vInit message processor 220 is implemented) acts as a relay node, vInit message processor 220 is configured to forward a received vInit message (after inserting a label into the vInit message) toward the target node. If the node (on which vInit message processor 220 is implemented) acts as the target node, vInit message processor 220 is configured to instruct vInit message generator 210 to generate a responsive vInit message and to transmit the responsive vInit message back towards the requesting node. Example transmission paths of vInit messages between a requesting node and target node is further discussed in connection with FIG. 3B.

vLDP message generator 240 is configured to generate a virtual LDP (vLDP) message, impose one or more labels on the vLDP message (which are gathered during initialization of the vLDP session, as further discussed below in connection with FIG. 3A), and transmit the vLDP message to its destination (or label-switch the vLDP across a "stitched" point-to-point LSP between the requesting node and the target node, which is defined by the one or more labels imposed on the vLDP message). In one embodiment, a vLDP message includes an LDP message, where the LDP message is encapsulated in a vLDP message. In another embodiment, a vLDP message is an LDP message that is identified as a vLDP message, where the LDP message includes optional vLDP parameters. The LDP messages that are encapsulated or otherwise identified as vLDP messages are defined by LDP protocol logic. An example of a vLDP message is further discussed below in connection with FIG. 4.

vLDP message processor 250 is configured to receive and process a vLDP message. In one embodiment, vLDP message processor 250 decapsulates a received vLDP message to reveal the LDP message. In another embodiment, vLDP message processor 250 determines that a received message is identified as a vLDP message. vLDP message processor 250 is also configured to process a received vLDP message cooperatively with LDP protocol logic (e.g., can provide the decapsulated LDP message to LDP logic module 140 or uses existing logic present in LDP logic module to process the received vLDP message).

FIG. 3A is a block diagram illustrating components of an example virtual LDP initialization (vInit) message. vInit message 300 is generated by vInit message generator 210 of vLDP logic module 150, where vInit message 300 can be originated by an edge LSR on which vLDP logic module 150 is implemented. A vInit message is sent from a requesting node to a target node to request that a vLDP session be established between the requesting node and the target node. A vInit message is forwarded over a number of existing TCP connections via one or more relay nodes between the requesting node and the target node. The TCP connections may have been previously established while the requesting node, target node, and one or more relay nodes established LDP sessions with their directly connected LDP neighbors. A vInit message is also sent in response from the target node to the requesting node to confirm that the request to establish a vLDP session is accepted.

The format of vInit message 300 includes an LDP ID (identifier) 305, a session ID (identifier) 310, one or more relay labels 320, a source address 330, and a destination address 340. In another embodiment, session ID 310, relay label(s) 320, source address 330, and destination address 340 can be defined as optional parameters of a (traditional) LDP initialization message, where an LDP initialization message with these optional parameters is a vInit message. Each component is further discussed below.

LDP ID 305 is a piece of data (often a six-byte quantity) that identifies the label space of the originating node, as defined by LDP protocol logic. For example, if vInit message 300 were originated by a requesting node, the vInit message would include the LDP ID of the requesting node. Session ID 310 is a piece of data (such as a hash value, random number, and/or random string) generated to identify a vLDP session between a pair of LSRs, or between a requesting node and a target node. Source address 330 is the IP address of the requesting node that generates the vInit message. Destination address 340 is the IP address of the target node to which the vInit message will be sent. Using the example illustrated in FIG. 1, source address 330 is the IP address of requesting node LSR 120(1) that wishes to establish a vLDP session with target node LSR 120(N), and destination address 340 is the IP address of target node LSR 120(N).

It is noted that when vInit message 300 is initially generated by the requesting node, vInit message 300 will not include a relay label 320. The requesting node sends vInit message 300 toward the target node via one or more relay nodes. When a (first) relay node (such as border LSR 130 in FIG. 1) receives vInit message 300 from the requesting node, the relay node determines that it does not own destination address 340 and that vInit message 300 indicates a vLDP session is being established. In response, the relay node adds the label that the requesting node advertised to the relay node (e.g., the outgoing label that the relay node uses to reach the requesting node) as a new relay label 320 to vInit message. The relay node then forwards vInit message toward the target node (that is identified in destination address 340). Using the example illustrated in FIG. 1, the vInit message is forwarded by a single relay node, border LSR 130, to target node LSR 120(N). Receipt of the vInit message at the target node is further discussed below in connection with FIG. 3B.

FIG. 3B is a block diagram illustrating components of an example transmission path of a vInit message from a requesting node 350(1) to a target node 350(2) via two relay nodes 355(1) and 355(2). Although only two relay nodes are illustrated, more than two relay nodes could be located between requesting node 350(1) and target node 350(2). It is noted that each relay node must also have an existing TCP connection with its neighboring node (e.g., have IP connectivity with a next hop relay node) in order for the vLDP session to be established across the relay nodes. As illustrated, TCP connections 360(1), 360(2), and 360(3) respectively couple nodes 350(1), 355(1), 355(2), and 350(2). The TCP connections may have been previously established when the requesting node, target node, and one or more relay nodes established various LDP sessions with their directly connected LDP neighbors. Thus, the one or more relay nodes are also LDP neighbors and an LDP session may also be running over each of TCP connections 360(1)-(3).

As illustrated, vInit message 300 is sent from requesting node 350(1) to a (first) relay node 355(1), as discussed above in connection with FIG. 3A. vInit message is then forwarded from relay node 355(1) to the next relay node 355(2) toward the target node over TCP connection 360(2). In other words, receiving relay node 355(2) receives vInit message from forwarding relay node 355(1). Receiving relay node 355(2) determines that it does not own destination address 340 and that the vInit message indicates a vLDP session is being established. In response, receiving relay node 355(2) adds the label that forwarding relay node 355(1) advertised to receiving relay node 355(2) (e.g., the outgoing label that the receiving relay node uses to reach the forwarding relay node) as a new relay label 320 to vInit message 300. Receiving relay node 355(2) adds the new relay label to vInit message by pushing the new relay label on top of a stack of existing relay label(s) included in vInit message (also referred to as a relay label stack). The most-recently added relay label is the top or outer label of the relay label stack, while the oldest added relay label (e.g., the label added by the relay node that first received vInit message from the requesting node) is the bottom or inner label of the relay label stack. Receiving relay node 355(2) then forwards the vInit message toward the target node (that is identified in destination address 340). This process repeats at the next relay node (if any) that receives the vInit message. A stack of one or more relay labels is collected in the vInit message, as the vInit message is forwarded toward the target node.

Once target node 350(2) receives vInit message 300 from a (terminal or final) relay node (where the vInit message has been forwarded by a single relay node or by more than one relay node), target node 350(2) determines that it owns destination address 340 and that vInit message 300 indicates a vLDP session is being established. In response, the target node extracts the stack of one or more relay labels 320 from the received vInit message and stores the stack of relay labels (e.g., in an LFIB table). The target node may also push an outer label on top of the stored stack of relay labels, where the outer label is advertised by the terminal relay node to the target node (e.g., the outgoing label that the target node uses to reach the terminal relay node). The target node also associates the (stored) relay labels and outer label with the session ID 310 of the vLDP session and/or the LDP ID of the requesting node (which are included in the received vInit message). The stack of relay labels, including the outer label, defines a return path (e.g., a stitched point-to-point LSP) from the target node back to the requesting node, along the same path followed by the vInit message from the requesting node to the target node.

The target node also generates a responsive vInit message to send back to the requesting node. The responsive vInit message includes the same session ID 310 of the received vInit message to indicate confirmation that the request to establish a vLDP session is accepted. The responsive vInit message also includes source address 330 of the target node, destination address 340 of the requesting node, and LDP ID of the target node. In one embodiment, target node 350(2) can use the stack of relay label(s) 320 to label-switch the responsive vInit message directly back to requesting node 350(1).

In another embodiment, the responsive vInit message is forwarded toward requesting node 350(1) and collects a second stack of one or more relay labels 320, as discussed above. The requesting node extracts and stores the second stack of relay labels (e.g., in an LFIB table), and pushes an outer label on the second stack of relay labels, where the outer label is an outgoing label that reaches the relay node from which the responsive vInit message is received. The requesting node associates the (stored) relay labels and outer label with the session ID of the vLDP session and/or the LDP ID of the target node (which are included in the responsive vInit message). The second stack of relay labels, including the outgoing label, defines a return path (e.g., a stitched point-to-point LSP) from the requesting node back to the target node, along the same path followed by the responsive vInit message from the target node to the requesting node. The vLDP session is established when the requesting node receives the responsive vInit message.

Thus, in one embodiment, the LFIB of the requesting node may include the following entry illustrated in Table A (where the label stack to reach the target node may include an additional relay label for each additional relay node located between the requesting node and the target node):

TABLE A

| Address of Target Node | Session ID | LDP ID of Target Node | Label Stack to reach Target Node: Outer Label (Requesting Node to Relay Node) Return Label (Relay Node to Target Node) |
|---|---|---|---|

The LFIB of the target node may include the following entry illustrated in Table B (where the label stack to reach the requesting node may include an additional relay label for each additional relay node located between the requesting node and the target node):

TABLE B

| Address of Requesting Node | Session ID | LDP ID of Requesting Node | Label Stack to reach Requesting Node: Outer Label (Target Node to Relay Node) Relay Label (Relay Node to Requesting Node) |
|---|---|---|---|

FIG. 4 is a block diagram illustrating components of an example vLDP message 400. Once the vLDP session is established between the requesting node and the target node, vLDP messages can be exchanged between the requesting node and the target node over the TCP connections using the relay label stack and outer label collected during initialization of the vLDP session. In other words, one end node can send message over a stitched point-to-point LSP to the destination end node by imposing the relay label stack and outer label on the message and label-switching the message to the destination end node.

vLDP message 400 includes an LDP ID (identifier) 410, a session ID (identifier) 310, and a (traditional) LDP message 420. In another embodiment, LDP ID 410 and session ID 310 can be defined as optional parameters of a (traditional) LDP message, where an LDP message with these optional parameters is a vLDP message. Each component is further discussed below.

LDP ID 410 is a piece of data (often a six-byte quantity) that identifies the label space of the destination end node, which was previously included in the vInit message used to establish the vLDP session. Session ID 310 is a piece of data that identifies the vLDP session established between the requesting and target nodes, which was previously included in the vInit message used to establish the vLDP session. In one embodiment, each vLDP session can be uniquely identified by a combination of the LDP ID and session ID. For example, a target node that has the entry illustrated above in Table B would retrieve the LDP ID of the requesting node from the LFIB table entry (and the session ID of the vLDP session established between the target node and the requesting node) for inclusion in the vLDP message to the requesting node. LDP message 420 is a (traditional) LDP message used for communication between the pair of nodes (e.g., a label mapping message, a notification message, and the like), as defined by LDP protocol logic.

The requesting node and the target node use their respective stacks of one or more relay labels 320 (included in the vInit message received by the requesting node or target node) to communicate with one another by imposing the respective stack of relay labels 320 on a vLDP message sent to the other node. The requesting node and the target node also impose an outer label 430 that is used (by the requesting node or the target node) to reach the terminal relay node (e.g., the (final) relay node from which the vInit message was received). The respective stacks and outer labels are also illustrated above in Tables A and B.

Using the example scenario illustrated in FIG. 3B, target node 350(2) receives a stack of one or more relay labels 320 in a vInit message. Target node 350(2) imposes stack of relay label(s) 320 in the same sequence or order on a vLDP message 400 that is being sent to requesting node 350(1). Target node 350(2) also imposes the outgoing label that target node 350(2) uses to reach relay node 355(2) as outer label 430. vLDP message 400 can then be label-switched back to the requesting node using outer label 430 and relay label(s) 320, despite the lack of IP connectivity between the requesting node and the target node.

Continuing the example scenario illustrated in FIG. 3B, requesting node 350(1) receives a second stack of one or more relay labels 320 in a responsive vInit message. Requesting node 350(1) imposes relay label(s) 320 in the same sequence or order on a vLDP message 400 that is being sent to target node 350(2). Requesting node 350(1) also imposes the outgoing label that requesting node 350(1) uses to reach relay node 355(1) as outer label 430. vLDP message 400 is label-switched back to target node 350(2) using the outer label and second stack of relay label(s) 320.

When a vLDP message is received by a requesting node or target node, the requesting node or target node processes the LDP message included in the vLDP message using (traditional) LDP protocol logic. In one embodiment, if a label mapping message is received at an end node (e.g., requesting node or target node), the end node replies to the other end node with an acknowledgement message (conveyed over the vLDP session) indicating that the label mapping message was received. In such an embodiment, some reliability state may be required at the relay node (e.g., a transactional ID that identifies the particular label mapping message being acknowledged). However, the window of opportunity for losing vLDP messages is small, so in another embodiment, a normal LDP graceful restart procedure can be applied (as discussed below) instead of implementing end-to-end acknowledgements.

In the event the vLDP session goes down (e.g., a TCP connection fails or the relay node fails), vLDP messages can no longer be exchanged between the pair of edge LSRs. In such a scenario, the vLDP session can be re-established via another relay node (if available), using the same session ID. For example, there could be an alternate path between the requesting node and the target node via a backup relay node (not shown), where the backup relay node (or one or more backup relay nodes) is an LDP neighbor of the requesting node and the target node.

In the event a TCP connection fails between the requesting node and the target node, the relay node coupled to the failed TCP connection will notify the end node (e.g., requesting node or target node, depending on where the failure occurs) of the failure using a vLDP peer-down notification. The notified end node (that receives the peer-down notification) starts a local timer and will send a vInit message for the same session ID and LDP ID via other alternate paths to reach the other end node. For example, the requesting node can send a vInit message with the same session ID to the target node via a backup relay node. If the notified end node receives a responsive vInit message from the other end node within the local timer expiry, the notified end node will continue to use the vLDP session (e.g., uses the same vLDP session ID). If the local timer has expired before the notified end node receives the responsive vInit message, the vLDP session is considered torn down.

In the event that the relay node fails, it is possible that some vLDP messages in transit may be lost. When this happens, the vLDP session is torn down and the end nodes can perform normal LDP graceful restart behavior. For example, the LDP state (e.g., FEC state, LDP bindings, and/or mLDP forwarding state) at the end nodes is maintained after the vLDP session is town down and is recovered for use in a subsequent (new) vLDP session (e.g., the label mappings at the end nodes are synchronized with one another).

In one embodiment, a backup vLDP session could be established at a time before the primary vLDP session fails. For example, a backup vLDP session can be established on an alternate ECMP (Equal Cost MultiPath) or LFA (Loop Free Alternate) path, if such a path is known. A backup vLDP session is further discussed below in connection with FIG. 6.

Finally, while a vLDP session could replace a targeted LDP session (e.g., in situations where a targeted LDP session cannot be established), a vLDP session could be established over a targeted LDP session in one embodiment. Such an embodiment could be used to reduce the number of labels used during a targeted LDP session to reach the destination node. Using the illustrated example in FIG. 3B (and for this embodiment only, nodes 350(1), 355(1) and 355(2) have IP connectivity with one another), a targeted LDP session can be established between the requesting node 350(1) and relay node 355(2), where a point-to-point (P2P) LSP is established between requesting node 350(1) and relay node 355(2) using targeted LDP. In this embodiment, a vLDP session could also be established over the targeted LDP session, between requesting node 350(1) and target node 350(2). When relay node 355(2) receives a packet from the target node 350(2) over the vLDP session, relay node 355(2) need only use the (single) label of the established P2P LSP to forward the packet over the P2P LSP to the requesting node 350(1), rather than using two labels to reach the destination (e.g., a label from node 355(2) to 355(1), and another label from node 355(1) to 350(1)).

FIG. 5A is a flowchart illustrating operations of an example vLDP session establishment process implemented by a vLDP logic module on a requesting node (or LSR) in a first network segment that has limited routing information. vLDP logic module is configured to cooperate with an LDP logic module also configured on the requesting node (e.g., use existing mechanisms of LDP logic module, as discussed above) to perform the process illustrated in FIG. 5A.

Figure 5A:
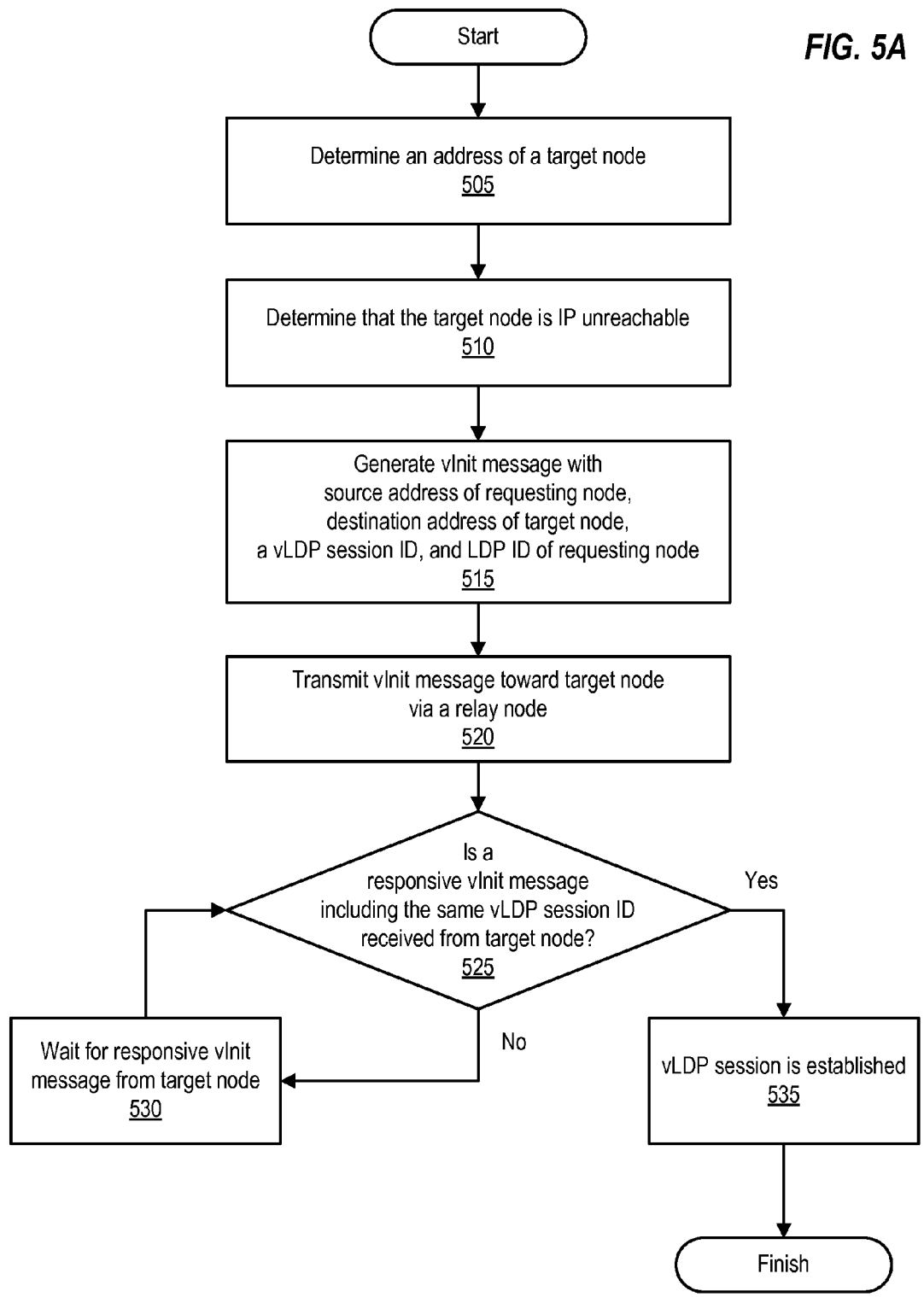
FIGS. 5A and 5B are flowcharts illustrating operations of an example vLDP session establishment process, according to one embodiment.

The process illustrated in FIG. 5A starts at operation 505, where an IP unreachability detector of vLDP logic module determines an address of a target node. As discussed above in connection with FIG. 2, IP unreachability detector uses a discovery mechanism to determine or discover the target node's address. The process continues to operation 510, where the IP unreachability detector determines that the target node is IP unreachable (e.g., consult a BGP table and/or other routing tables at the requesting node to determine no route is known for the target node's address). In other words, IP unreachability detector detects that a targeted LDP session cannot be established from the requesting node in the first network segment to an IP unreachable target node in a second network segment.

The process continues to operation 515, where vInit message generator of vLDP logic module generates a vInit message. The vInit message includes a source address of the requesting node, a destination address of the target node, a session ID of the vLDP session being established, and the LDP ID of the requesting node. The process continues to operation 520, where vInit message generator transmits the vInit message toward the target node via an IP reachable relay node. As discussed above in connection with FIG. 2, a discovery mechanism also exists to discover a relay node that reaches the target node (e.g., consult a BGP table and/or other routing tables at the requesting node and determine a directly connected IP reachable relay node that is the next hop node toward the target node). The vInit message is transmitted from a port of the requesting node directly connected to the relay node, where the vInit message is transmitted over a TCP connection coupling the requesting node and the relay node.

The process continues to operation 525, where vInit message processor of the requesting node detects whether a responsive vInit message is received on a port of the requesting node from the target node (via the directly connected relay node that reaches the target node). The responsive vInit message includes a same vLDP session ID of the (initial) vInit message that was sent to the target node and source address of the target node. The responsive vInit message also includes an LDP ID of the target node. If a responsive vInit message has not been received, the process continues to operation 530, where vInit message processor waits for the responsive vInit message from the target node. The process returns to operation 525 to check whether the responsive vInit message has been received. Once the responsive vInit message is received at the requesting node (over the TCP connection coupling the requesting node and the relay node), the process continues to operation 535, where the vLDP session is established. The responsive vInit message, or portion thereof, can be directed internally to vInit message processor of the requesting node. In one embodiment, vInit message processor extracts a stack of one or more relay labels from the responsive vInit message using a relay label extractor. In one embodiment, vInit message processor also stores the stack of one or more relay labels (e.g., locally at the requesting node). In one embodiment, vInit message processor also pushes an outer label on the stored relay label stack, where the outer label is an outgoing label is used by the requesting node to reach the relay node from which the responsive vInit message is received. In one embodiment, the (stored) relay label stack and outer label are also associated with the session ID of the vLDP session and/or the LDP ID of the target node that are included in the responsive vInit message. The process then ends.

FIG. 5B is a flowchart illustrating operations of an example vLDP session establishment process implemented by a vLDP logic module on a receiving node (or LSR), such as a relay node located between network segments or a target node located in the second network segment that has limited routing information. vLDP logic module is configured to cooperate with an LDP logic module also configured on the receiving node (e.g., use existing mechanisms of LDP logic module, as discussed above) to perform the process illustrated in FIG. 5B.

Figure 5B:
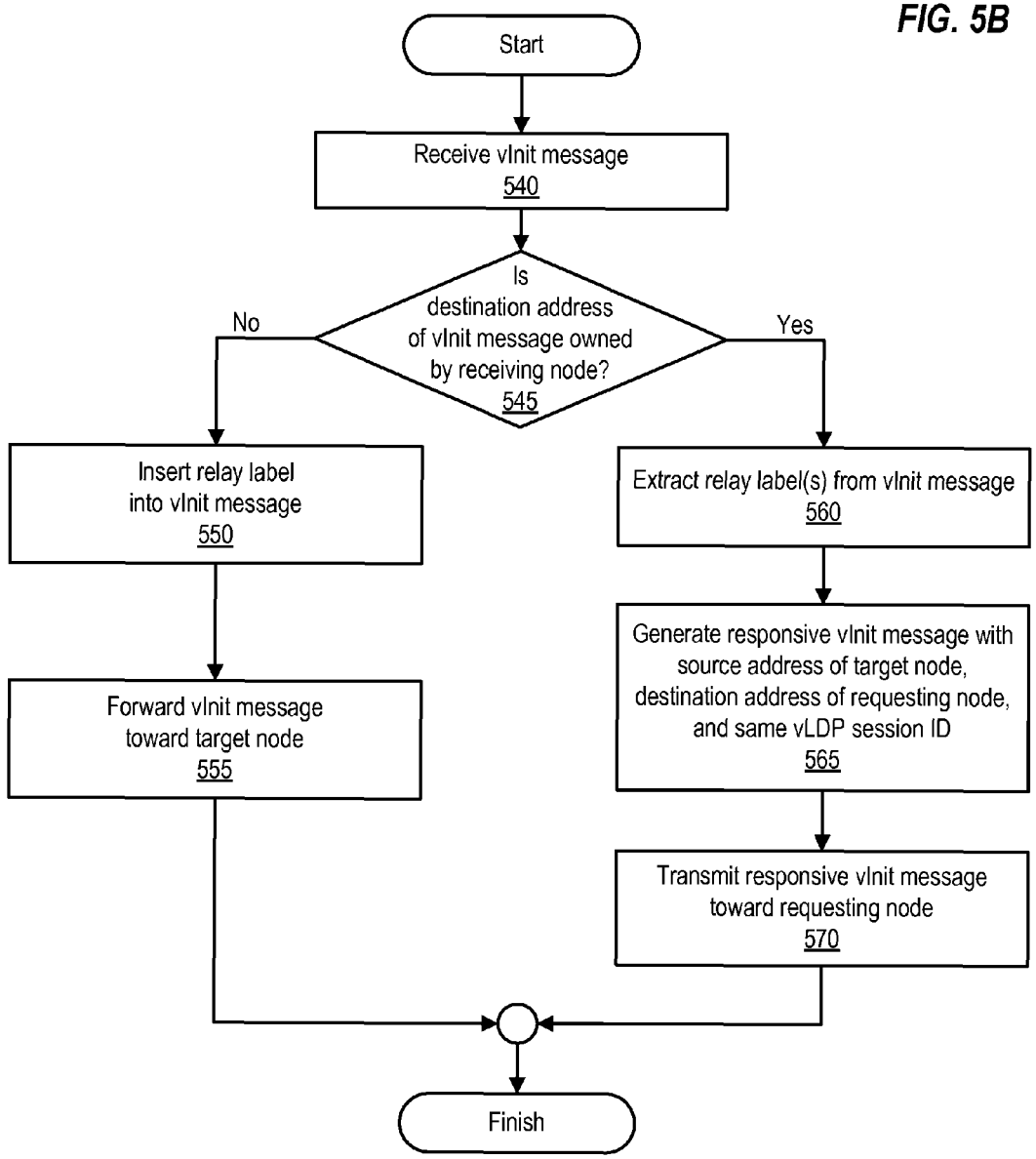

The process illustrated in FIG. 5B starts at operation 540, where vInit message processor of vLDP logic module detects that a vInit message has been received at a port of the receiving node over a TCP connection (which can be coupled to a requesting node or to a relay node). The vInit message, or portion thereof, can be directed internally to vInit message processor. The process continues to operation 545, where vInit message processor determines whether the destination address of the vInit message is owned by the receiving node. If the receiving node does not own the destination address, the receiving node is a relay node and the process continues to operation 550. At operation 550, the vInit message processor of the relay node inserts a relay label into the vInit message using a relay label insertor (such as by pushing the relay label onto an existing label stack, if any, in the vInit message), which produces an updated vInit message. The process continues to operation 555, where the vInit message processor of the relay node forwards the updated vInit message toward the target node. For example, vInit message processor can consult a BGP table and/or other routing tables at the relay node and determine an IP reachable relay node that is the next hop node toward the target node, or can determine that the target node itself is the next hop node. The updated vInit message is transmitted from a port of the relay node directly connected to the next hop node over a TCP connection coupling the relay node and the next hop node (e.g., the target node or another relay node). The process then ends.

Returning to operation 545, if the receiving node owns the destination address, the receiving node is a target node and the process continues to operation 560. At operation 560, the vInit message processor of the target node extracts a stack of one or more relay labels from the vInit message using a relay label extractor. In one embodiment, vInit message processor also stores the stack of one or more relay labels (e.g., locally at the target node). In one embodiment, vInit message processor also pushes an outer label on the stored relay label stack, where the outer label is an outgoing label is used by the target node to reach the relay node from which the responsive vInit message is received. In one embodiment, the (stored) relay label stack and outer label are also associated with the session ID of the vLDP session and/or the LDP ID of the requesting node that are included in the vInit message.

The process continues to operation 565, where vInit message generator of the target node generates a responsive vInit message. The responsive vInit message includes a source address of the target node, a destination address of the requesting node, and the same vLDP session ID that was included in the received vInit message. The responsive vInit message also includes an LDP ID of the target node. The process continues to operation 570, where vInit message generator of the target node transmits the responsive vInit message towards the requesting node via the IP reachable relay node from which the initial vInit message is received. The responsive vInit message is transmitted from a port of the target node over a TCP connection coupling the target node and the relay node. In one embodiment, vInit message generator imposes on the responsive vInit message: the stack of relay labels of the (received) vInit message and an outgoing label that reaches the relay node from which the (received) vInit message (of operation 540) was received. In such an embodiment, the responsive vInit message is label-switched back to the requesting node (without collecting a second stack of relay labels). The process then ends.

Figure 5C:
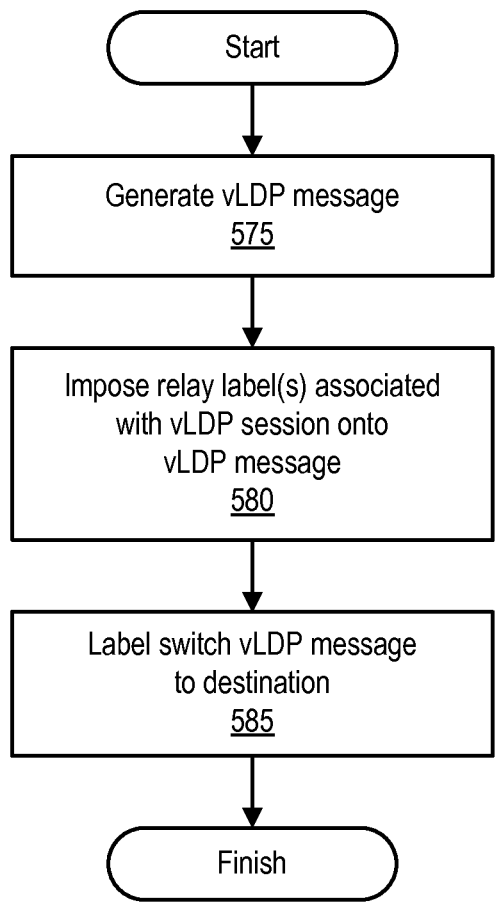
FIG. 5C is a flowchart illustrating operations of an example vLDP message exchange process using a vLDP session, according to one embodiment.

FIG. 5C is a flowchart illustrating operations of an example vLDP message exchange process implemented by a vLDP logic module configured on an end node (e.g., a requesting node or a target node), using a vLDP session established between a requesting node and a target node. The process illustrated in FIG. 5C is performed at vLDP logic module is configured to cooperate with an LDP logic module also configured on the same end node (e.g., use existing mechanisms of LDP logic module, as discussed above) to perform the process illustrated in FIG. 5C.

The process illustrated in FIG. 5C starts at operation 575, where vLDP message generator of vLDP logic module generates a vLDP message. The vLDP message includes a LDP ID of the destination end node, the session ID that identifies the vLDP session over which the vLDP message is sent, and an LDP message. The process continues to operation 580, where vLDP message generator imposes the (stored) stack of relay label(s) associated with the session ID and/or the LDP ID onto the vLDP message. The (stored) stack of relay label(s) includes an outer label that reaches the relay node directly connected to the end node implementing the process illustrated in FIG. 5C. The process continues to operation 585, where the vLDP message is label-switched to the destination end node. For example, if the target node is sending a vLDP message to the requesting node, the target node will retrieve the relay labels (and outer label) associated with the session ID that identifies the vLDP session established between the requesting node and the target node and/or with the LDP ID of the requesting node. The target node will impose the relay labels on the vLDP message and label switch the vLDP message back to the requesting node. The process then ends.

Figure 6:
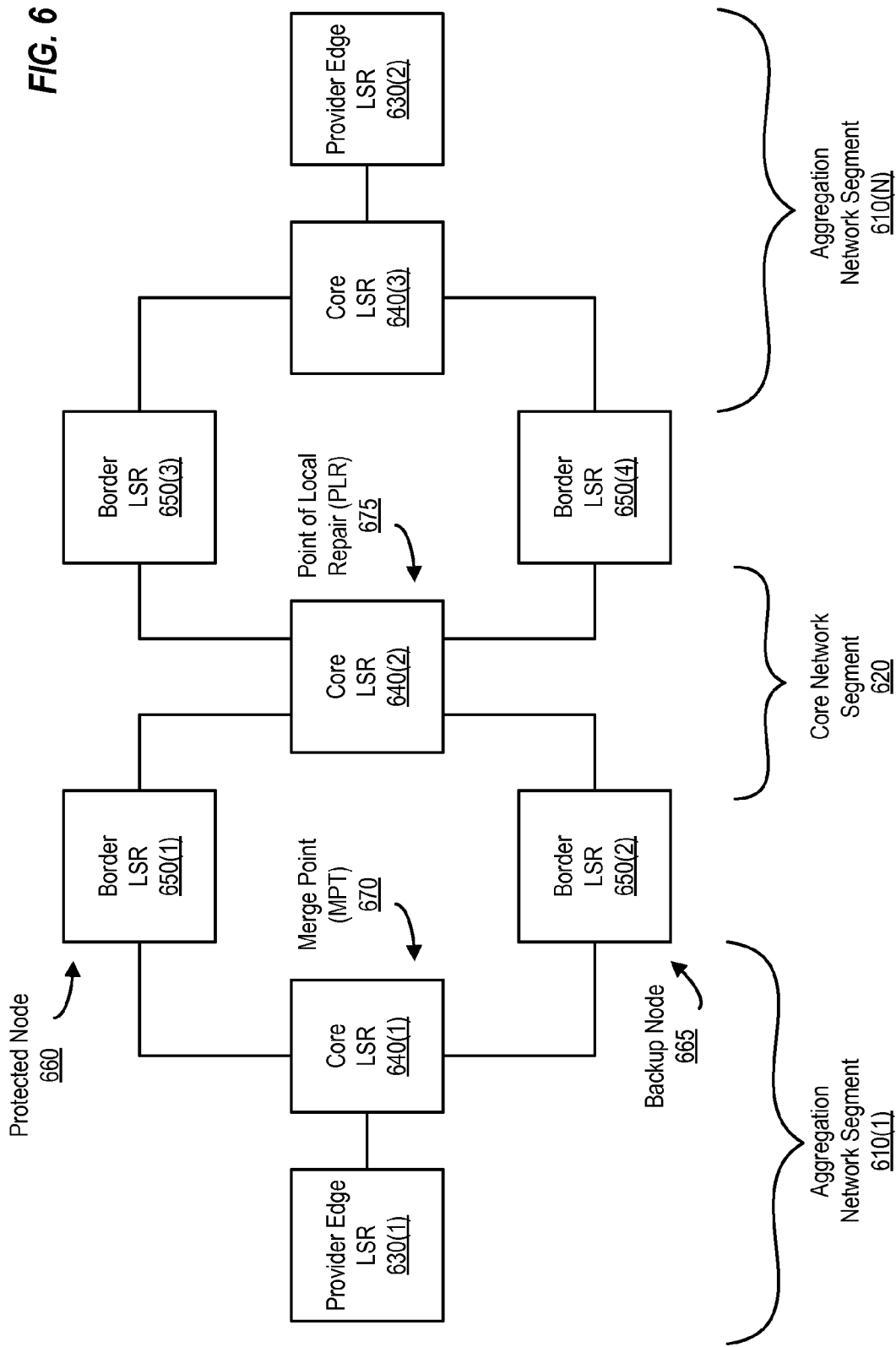
FIG. 6 is a block diagram illustrating components of another example network in which the present disclosure can be implemented, according to one embodiment.

FIG. 6 is a block diagram illustrating components of an example network in which the present disclosure can be implemented. Two aggregation network segments 610(1) and 610(N) are coupled to a core network segment 620, which couple provider edge LSRs 630(1) and 630(2). Each network segment includes a number of core LSRs 640 and are coupled by a number of border LSRs 650. As illustrated, aggregation network segment 610(1) is coupled to core network segment 620 via border LSRs 650(1) and 650(2), while aggregation network segment 610(N) is coupled to core network segment 620 by border LSRs 650(3) and 650(4).

mLDP (multipoint LDP) node protection is implemented in FIG. 6, where border LSR 650(1) is a protected node 660. As implemented by mLDP protocol logic (which can be included in LDP protocol logic implemented on a node), the protected node determines its upstream neighbor, core LSR 640(2), which is the Point of Local Repair 675. The protected node informs its downstream neighbor, core LSR 640(1), which is the Merge Point (MPT) 670, about the PLR. For example, the protected node advertises the PLR's address to the MPT in an mLDP notification message. The MPT (traditionally) establishes a targeted LDP session with the PLR and registers its interest in receiving content (which would usually be forwarded by the protected node to the MPT via a particular multipoint LSP) from the PLR in the event that the protected node fails. If the protected node fails, content can be redirected around the failed node from the PLR to the MPT. However, if the MPT and PLR do not have IP connectivity with one another (e.g., the MPT and PLR are located in different network segments that have limited routing information, as discussed above), the MPT cannot establish a targeted LDP session with the PLR and signal the MPT's interest to the PLR. Instead, the MPT can establish a vLDP session with the PLR (as also discussed above), using the protected node as a relay node. The MPT can inform the PLR of the MPT's interest in receiving content of the particular multipoint LSP, in the event that the protected node fails. In one embodiment, the particular multipoint LSP is identified by an FEC, which can be included in an FEC element of an mLDP message (e.g., an mLDP notification sent to the PLR).

Additionally, mLDP protocol logic builds a multipoint LSP (such as the particular multipoint LSP that will provide content to the MPT) from provider edge LSR 630(1) toward a root node (such as provider edge LSR 360(2)), where the address of the root node is included in an FEC that identifies the multipoint LSP. The FEC is included in an FEC element of an mLDP label mapping message. The mLDP label mapping message is forwarded to an intermediate node that is the next hop toward the root node. The intermediate node is expected to be able to look up the root node address in its routing tables in order to find a route toward the root node on which to forward the mLDP label mapping message. However, if the root node is not IP reachable by the intermediate node (e.g., is located in a different network segment that has limited routing information), the intermediate node cannot forward the mLDP label mapping message (and thus cannot build the LSP) to the root node.

In one embodiment, a border LSR that recognizes the root node is unreachable by an intermediate node (such as by consulting BGP tables and/or other routing tables) can create a new FEC element of the mLDP label mapping message, which is referred to as a recursive FEC element. The border LSR encapsulates the content of the original FEC element in the recursive FEC element and adds the address of a temporary root node (such as another border LSR from which the original root node is IP reachable) to the recursive FEC element. An intermediate node that receives the mLDP label mapping message with the recursive FEC element will forward the mLDP label mapping message (and build the LSP) toward the temporary root node address of the recursive FEC element, based on the route to the temporary root node in its routing tables. Once the mLDP label mapping message arrives at the temporary root node, the temporary root node recognizes the FEC element of the mLDP label mapping message is actually a recursive FEC and removes the temporary root node address (which is owned by the temporary root node) to reveal the original FEC element. The mLDP label mapping message can then be forwarded using the original FEC element toward the original root node. Accordingly, the recursive FEC element is used to forward an mLDP label mapping message across parts of the network where there is no IP reachability to the original root node (e.g., across core network segment 620).

As illustrated in FIG. 6, the mLDP label mapping message that includes an original FEC element would be forwarded hop by hop from provider edge LSR 630(1) to core LSR 640(1) to border LSR 650(1). (Core LSR 640(1) would know about border LSR 650(1) via an existing discovery mechanism, as discussed above in connection with FIG. 2.) Border LSR 650(1) recognizes that this is a segmented network and that next hop core LSR 640(2) does not have IP connectivity with the original root node (e.g., provider edge LSR 630(2)). Border LSR 650(1) also recognizes that border LSR 650(3) reaches the original root node (e.g., border LSR 650(3) is the access point for the network segment in which the original root node is located). In response, border LSR 650(1) creates a recursive FEC element by encapsulating the original FEC element with the temporary root node address of border LSR 650(3), such as by adding a header or other portion to the original FEC element that includes the temporary root node address. Border LSR 650(1) then forwards the mLDP label mapping message with the recursive FEC element to core LSR 640(2).

Core LSR 640(2) receives the mLDP label mapping message and views the FEC element included in the mLDP label mapping message as a normal FEC element, where border LSR 650(3) is identified as the root node. Core LSR 640(2) performs a look up of the root node address (of border LSR 650(3)) and forwards the mLDP label mapping message toward the root node. When border LSR 650(3) receives the mLDP label mapping message, border LSR 650(3) recognizes that the FEC element of the mLDP label mapping message is a recursive FEC element, and removes the temporary root node address from the FEC element, such as by stripping off the header or other portion from the recursive FEC element to reveal the original FEC element. Border LSR 650(3) can then forward the mLDP label mapping message based on the original FEC element.

In this embodiment using recursive FEC, the LSP is identified at MPT 670 (or core LSR 640(2)) using the recursive FEC, while the LSP is identified at PLR 675 (or core LSR 640(1)) using the original FEC. If node protection is applied to border LSR 650(1), MPT 670 registers its node protection interest with PLR 675 using the original FEC. Since the PLR is only aware of the recursive FEC (and cannot view the original FEC encapsulated within the recursive FEC), the PLR does not know to which LSP the MPT wishes to apply node protection. In such a scenario, the PLR would not be able to implement node protection for the particular LSP from which the MPT wishes to receive content.

Instead, when border LSR 650(1) (as protected node 660) creates a new recursive FEC for the particular LSP, the protected node also provides the recursive FEC to the MPT (such as in an mLDP notification message sent to the MPT, which may also be the same mLDP notification message that includes the PLR's address). The MPT then uses the recursive FEC for the particular LSP when registering its node protection interest with the PLR. The PLR uses the recursive FEC to identify the particular LSP that the MPT is interested in, and will forward content of the particular LSP to the MPT in the event the protected node fails.

Content of the particular LSP can be redirected around the protected node via a backup stitched point-to-point (P2P) LSP established between PLR and MPT. The MPT can determine that another border LSR 650(2) is connected to PLR (e.g., by consulting a BGP table or the address of border LSR 650(2) may be manually configured at MPT), which can serve as a backup node 665 for the protected node. The MPT (which has received PLR's address from the protected node) can establish a backup vLDP session with the PLR via border LSR 650(2) as a relay node. A backup stitched P2P LSP can also be established from the PLR to the MPT (e.g., exchanging label mapping messages over the vLDP session), using the stack of labels collected by a vInit message sent from the PLR to the MPT and an outer label that the PLR uses to reach the backup node. In the event the protected node fails, the MPT can send content of the particular LSP over the backup stitched P2P LSP from the MPT to the PLR (e.g., impose the relay label stack and outer label on content of the particular LSP at the MPT and label-switch the content to the PLR).

Figure 7A:
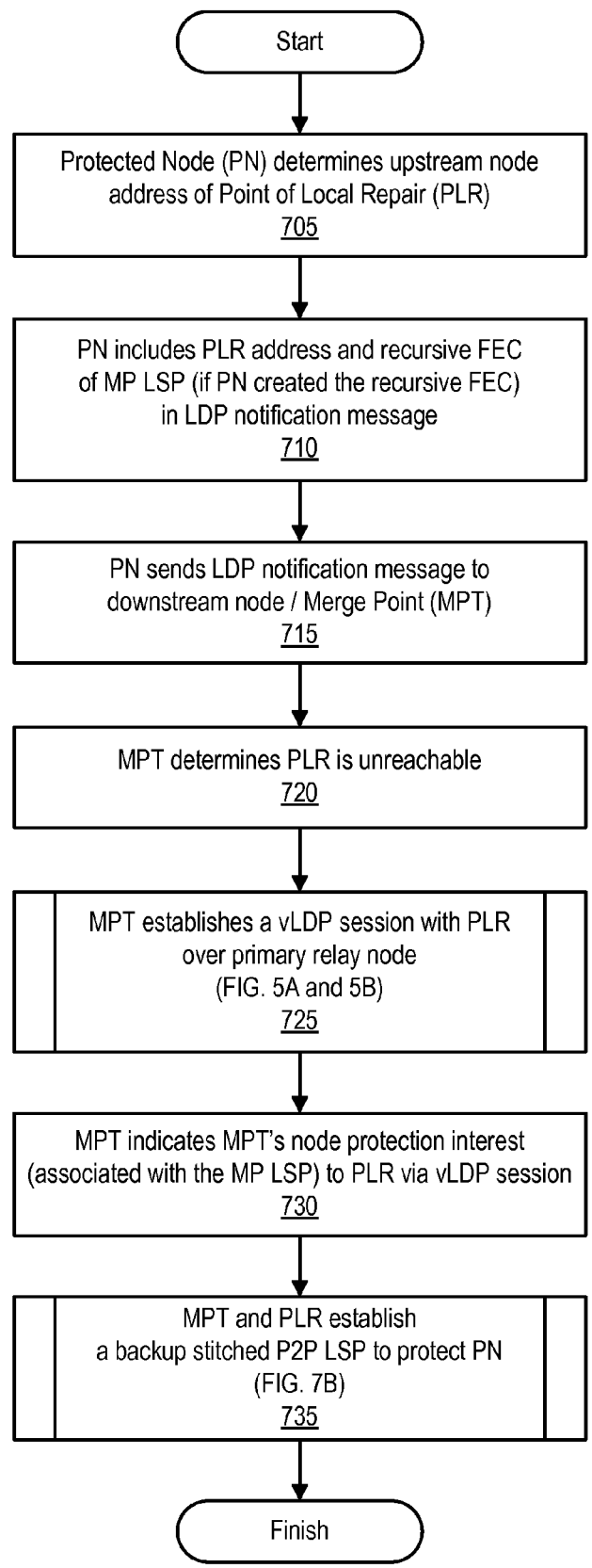
FIGS. 7A and 7B are flowcharts illustrating operations of an example mLDP node protection process implementing the present disclosure, according to one embodiment.
Figure 7B:
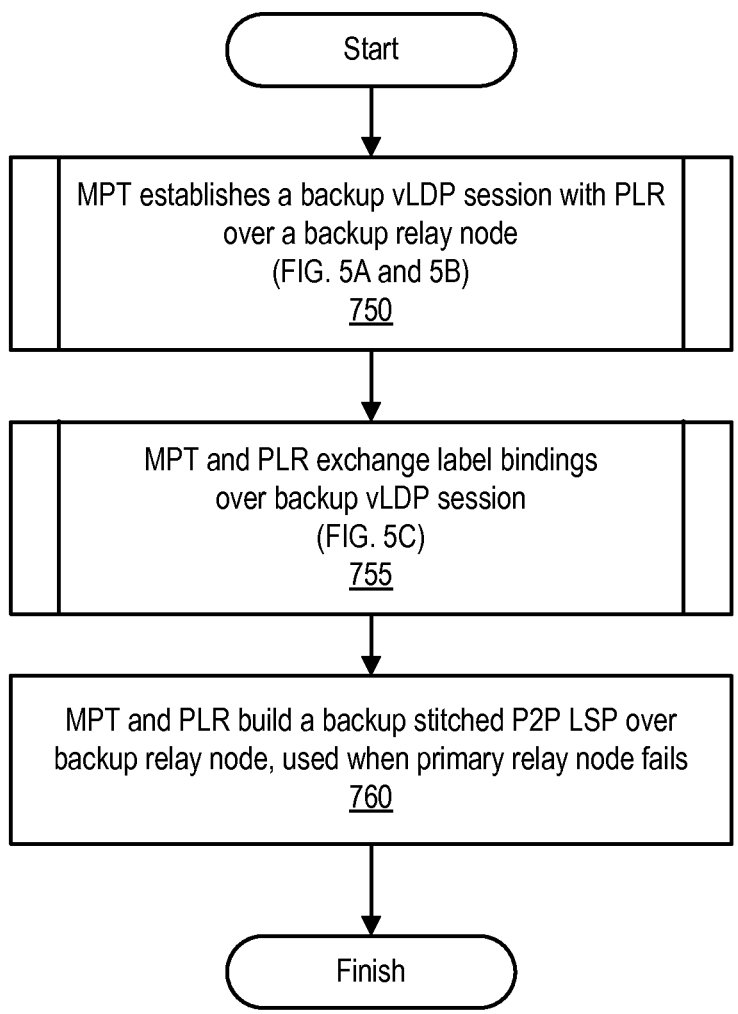

FIGS. 7A and 7B are flowcharts illustrating operations of an example mLDP node protection process implementing the present disclosure. The process illustrated in FIGS. 7A and 7B can be implemented in a network where a border LSR is a protected node in an mLDP node protection scenario.

The process illustrated in FIG. 7A starts at operation 705, where the protected node determines the address of its upstream node neighbor, which is the Point of Local Repair (PLR). The process continues to operation 710, where the protected node includes the PLR's address in an LDP notification message. The protected node also includes the recursive FEC of the multipoint (MP) LSP in the LDP notification message, if a recursive FEC was created by the protected node. The process continues to operation 715, where the protected node sends the LDP notification message to its downstream node neighbor, which is the Merge Point (MPT).

The process continues to operation 720, where the MPT determines that the PLR is unreachable (e.g., there is no IP connectivity between the MPT and the PLR), as discussed above. The process continues to operation 725, where the MPT establishes a vLDP session with the PLR over a primary relay node, as further discussed above in reference to FIGS. 5A and 5B (where MPT acts as the requesting node and PLR acts as the target node, and a vInit message is sent toward the PLR via the primary relay node). The process continues to operation 730, where the MPT indicates the MPT's node protection interest (which is associated with a particular MP LSP) to the PLR via the vLDP session. The process continues to operation 735, where the MPT and PLR establish a backup stitched P2P LSP to protect the protected node, as further discussed below in reference to FIG. 7B. The process then ends.

The process illustrated in 7B begins at operation 750, where the MPT establishes a backup vLDP session with the PLR over a backup relay node, as further discussed above in connection with FIGS. 5A and 5B (where MPT acts as requesting node and PLR acts as target node, and a vInit message is sent toward the PLR via the backup relay node). The process continues to operation 755, where the MPT and PLR exchange label bindings over the backup vLDP session, as further discussed above in connection with FIG. 5C. The process continues to operation 760, where the MPT and PLR build a backup stitched P2P LSP over the backup relay node, which is used in the event when the primary relay node (or a link to the primary relay node) fails. The process then ends.

Figure 8:
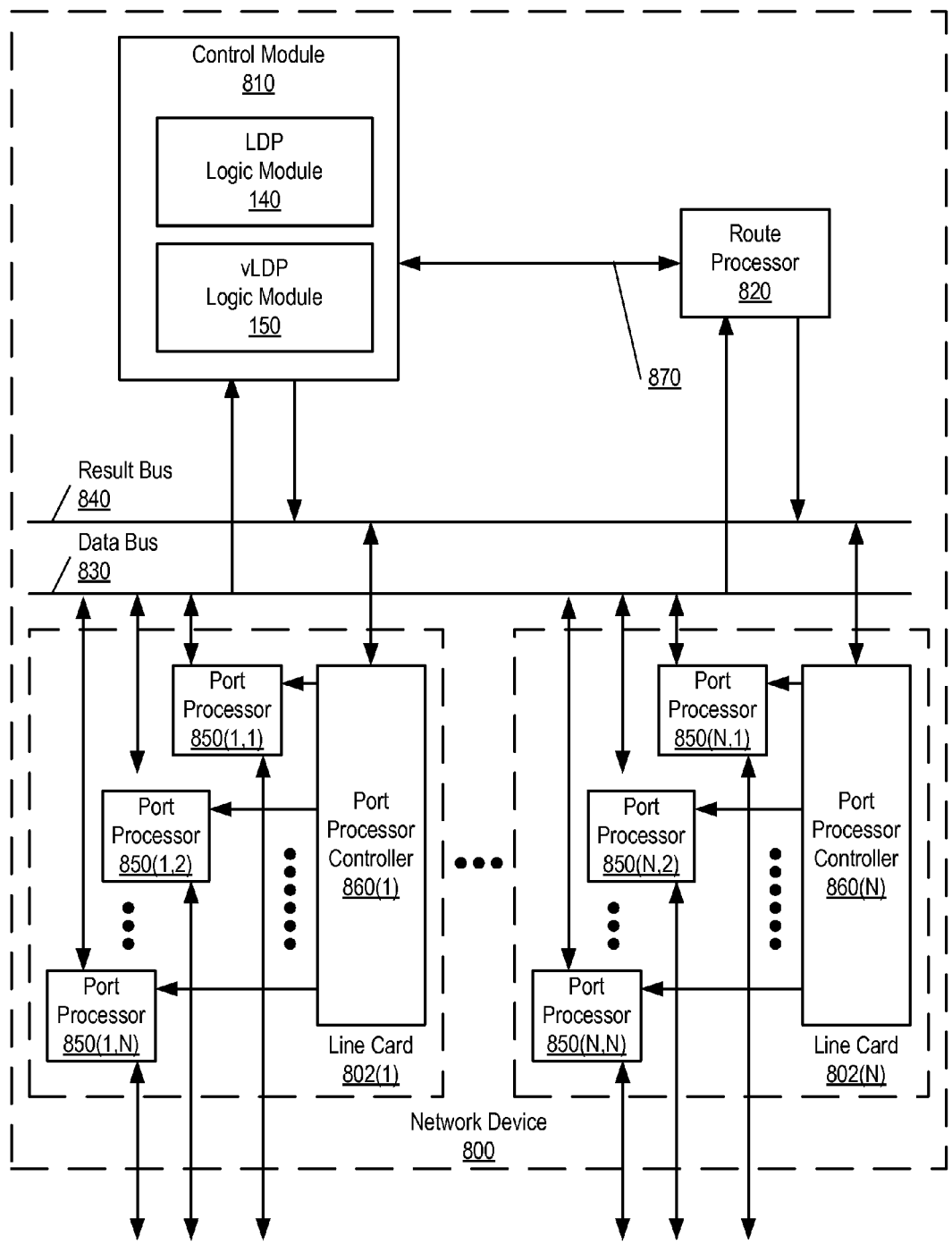
FIG. 8 is a block diagram illustrating components of an example network device in which the present disclosure can be implemented, according to one embodiment.

FIG. 8 is a block diagram illustrating components of an example network device 800 configured as a routing device (e.g., label switching routing elements 120(1)-(N) of FIG. 1). In this depiction, network device 800 includes a number of line cards (line cards 802(1)-802(N)) that are communicatively coupled to a control module 810 (which can include a forwarding engine, not shown) and a route processor 820 via a data bus 830 and a result bus 840. Line cards 802(1)-(N) include a number of port processors 850(1,1)-850(N,N) which are controlled by port processor controllers 860(1)-860(N). It will also be noted that control module 810 and route processor 820 are not only coupled to one another via data bus 830 and result bus 840, but are also communicatively coupled to one another by a communications link 870. It is noted that in alternative embodiments, each line card can include its own forwarding engine.

When a message (e.g., a vInit message and/or a vLDP message) is received by a network device such as network device 800 (e.g., received by a label switching routing element 120), the message is identified and analyzed by the network device in the following manner. Upon receipt, a message (or some or all of its control information) is sent from one of the port processors 850(1,1)-850(N,N) at which the message was received to one or more of those devices coupled to data bus 830 (e.g., others of port processors 850(1,1)-850(N,N), a forwarding engine, and/or route processor 820). Handling of the message can be determined, for example, by a forwarding engine. For example, a forwarding engine may determine that the message should be forwarded to one or more of port processors 850(1,1)-850(N,N). This can be accomplished by indicating to corresponding one(s) of port processor controllers 860(1)-860(N) that the copy of the message held in the given one(s) of port processors 850(1,1)-850(N,N) should be forwarded to the appropriate one of port processors 850(1,1)-850(N,N).

Network device 800 can implement LDP logic module 140 and/or vLDP logic module 150 in control module 810 (as shown), or in one of port processor controllers 860(1)-860(N) and/or in route processor 820 in order to implement the present disclosure. Although not shown, network device 800 can also implement a routing protocol module and/or network reachability protocol module in control module 810, in one of port processor controllers 860(1)-860(N), and/or in route processor 820 (not shown).

An incoming message (e.g., a vInit message or a vLDP message), or information thereof, can be provided to vLDP logic module 150 via a forwarding engine or port processor of a line card coupled to a port that received the incoming message. vLDP logic module 150 is also configured to communicate with LDP logic module 140 and to generate (in cooperation with LDP logic module 140) an outgoing message (e.g., a vInit message or a vLDP message), as described above in connection with FIG. 5A-5C. The outgoing message can be provided by vLDP logic module 150 to a forwarding engine, which can determine that the outgoing message should be forwarded to one or more of port processors 850(1,1)-850(N,N) that are configured to transmit the outgoing message (e.g., transmitted to another network device) toward the outgoing message's destination.

Figure 9:
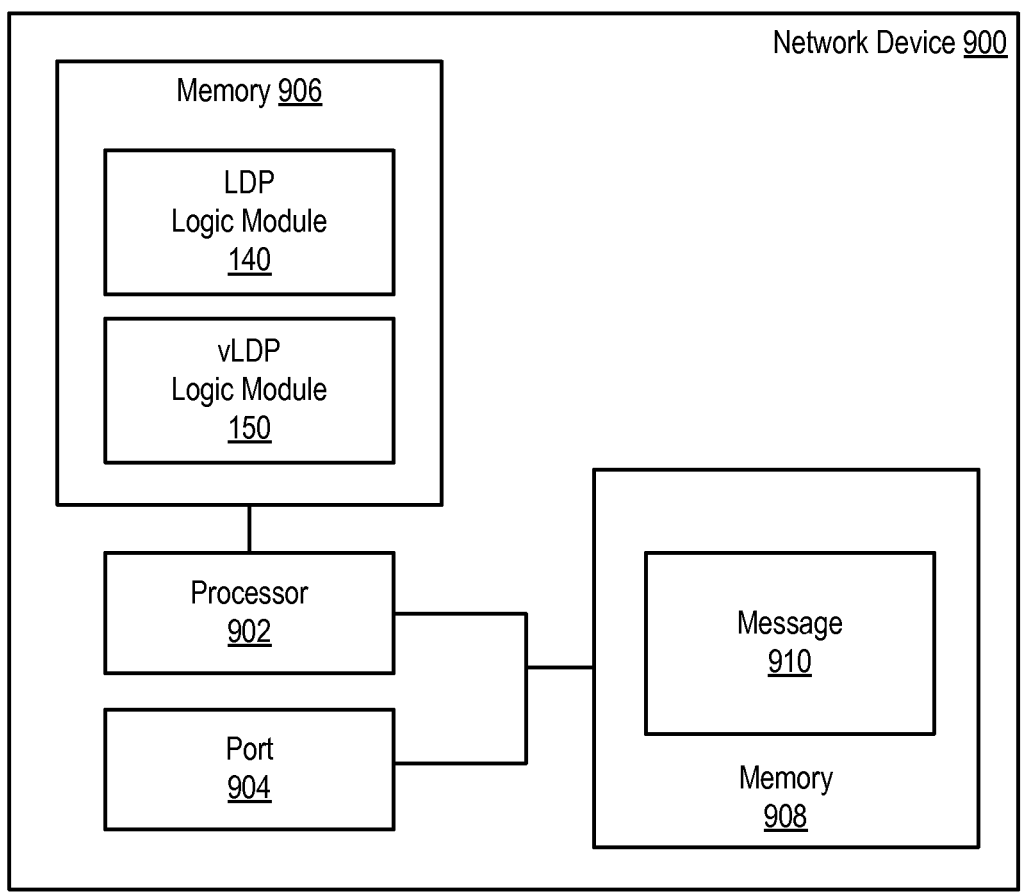
FIG. 9 is a block diagram illustrating components of an example network device in which the present disclosure can be implemented, according to one embodiment.

FIG. 9 is a block diagram illustrating components of an example network device 900, in which the network device is configured as a routing device (e.g., label switching routing elements 120(1)-(N) of FIG. 1). As illustrated, network device 900 includes one or more processors 902 (e.g., microprocessors, PLDs (Programmable Logic Devices), or ASICs (Application Specific Integrated Circuits)) configured to execute program instructions stored in memories 906 and/or 908, which are computer readable storage media. Memories 906 and 908 can include various types of RAM (Random Access Memory), ROM (Read Only Memory), Flash memory, MEMS (Micro Electro-Mechanical Systems) memory, and the like. Network device 900 also includes one or more ports 904 (e.g., one or more hardware ports or other network interfaces that can be linked to other network devices, hosts, servers, storage devices, or the like). Processor 902, port 904, and memories 906 and 908 are coupled to send and receive data and control signals by one or more buses or other interconnects.

In this example, program instructions executable to implement LDP logic module 140 and/or vLDP logic module 150 are stored in memory 906. Program instructions executable to implement a routing protocol module and/or a network reachability protocol module can also be stored in memory 906 and/or in memory 908 (not shown). Routing information and network reachability information can be stored in one or more routing tables and/or forwarding tables, including a label forwarding information base (LFIB) configured in memory 906 or 908 (not shown).

Message 910 (e.g., a vInit message or a vLDP message) is stored in memory 908. In one embodiment, message 910, or information thereof, can be received from port 904 (e.g., received from another network device coupled to port 904), and can be stored in memory 908 before being provided to vLDP logic module 150. vLDP logic module 150 includes functionality needed to establish a virtual LDP session by exchanging one or more messages (e.g., sending a vInit message in response to a received vInit message).

vLDP logic module 150 also includes functionality needed to communicate with LDP logic module 140 and to cooperatively generate (with LDP logic module 140) an outgoing message 910 (e.g., a vInit message or a vLDP message), as described above in connection with FIG. 9. In one embodiment, outgoing message 910 can be generated and stored in memory 908 before being transmitted via port 904 (e.g., transmitted to another network device in the network that is coupled to port 904).

Although the present disclosure has been described with respect to specific embodiments thereof, various changes and modifications may be suggested to one skilled in the art. It is intended such changes and modifications fall within the scope of the appended claims.

What is claimed is:

1. A method comprising:
  receiving a virtual Label Distribution Protocol initialization (vInit) message from a first node, wherein
    the vInit message is received at a receiving node, and
    the vInit message comprises a request to establish a virtual Label Distribution Protocol (vLDP) session between a requesting node in a first network segment and a target node in a second network segment;
  determining whether a destination address of the vInit message is owned by the receiving node; and
  in response to a determination that the destination address is not owned by the receiving node,
    determining that the receiving node is a relay node, wherein
      the relay node comprises a border label switching router (LSR), wherein the border LSR is coupled to at least the first network segment and the second network segment, and wherein the border LSR comprises a protected node;
    inserting, by the relay node, a relay label into the vInit message to produce an updated vInit message, wherein
      the relay label is an outgoing label that the relay node uses to reach the first node, and
    forwarding, by the relay node, the updated vInit message toward the destination address,
    wherein the protected node determines an upstream neighbor comprising a point of local repair and advertises an address of the point of local repair in a multipoint Label Distribution Protocol (mLDP) notification message to a downstream neighboring node.

2. The method of claim 1, wherein
  an existing TCP (Transmission Control Protocol) connection couples the first node and the receiving node,
  the vInit message is received from the first node via the existing TCP connection,
  the relay node forwards the updated vInit message without storing label switched path (LSP) specific information included in the updated vInit message, and
  the requesting node and the target node do not have IP (Internet Protocol) connectivity with one another.

3. The method of claim 1, further comprising:
  in response to a determination that the destination address is owned by the receiving node,
    determining that the receiving node is the target node,
    extracting, by the target node, a stack of one or more relay labels from the vInit message.

4. The method of claim 3, further comprising:
  storing, by the target node, the stack of one or more relay labels; and
  pushing an outer label on the stack of one or more relay labels, wherein
    the outer label is an outgoing label that the target node uses to reach the first node, and
    the stack of one or more relay labels and the outer label define a stitched point-to-point LSP (label switched path) from the target node to the requesting node.

5. The method of claim 3, further comprising:
  transmitting, by the target node, a responsive vInit message to the first node toward the requesting node, wherein
    the vInit message received at the target node comprises a session ID (identifier) that identifies the vLDP session,
    the responsive vInit message comprises the session ID, and
    the responsive vInit message confirms that the request to establish the vLDP session is accepted.

6. The method of claim 4, further comprising:
  generating, by the target node, a vLDP message;
  imposing the stack of one or more relay labels and the outer label onto the vLDP message, wherein the stack of relay labels and the outer label are associated with the vLDP session; and label-switching the vLDP message to the requesting node.

7. The method of claim 6, wherein
the vLDP message comprises an LDP message defined by LDP protocol logic,
the target node is not directly connected to the requesting node, and
the target node treats the requesting node as a directly connected LDP neighbor.

8. An apparatus comprising:
a processor; and
a memory coupled to the processor and configured to store instructions executable by the processor, the instructions configured to implement:
a virtual Label Distribution Protocol initialization (vInit) message processor configured to
detect receipt of a vInit message from a first node, wherein
the vInit message is received at a receiving node, and
the vInit message comprises a request to establish a virtual Label Distribution Protocol (vLDP) session between a requesting node in a first network segment and a target node in a second network segment,
determine whether a destination address of the vInit message is owned by the receiving node,
insert a relay label into the vInit message to produce an updated vInit message, in response to a determination that the destination address is not owned by the receiving node, wherein
the receiving node is determined to be a relay node,
the relay node comprises a border label switching router (LSR), wherein the border LSR is coupled to at least the first network segment and the second network segment, wherein the border LSR comprises a protected node, and
the relay label is an outgoing label that the relay node uses to reach the first node, and
forward the updated vInit message toward the destination address,
wherein the protected node determines an upstream neighbor comprising a point of local repair and advertises an address of the point of local repair in a multipoint Label Distribution Protocol (mLDP) notification message to a downstream neighboring node.

9. The apparatus of claim 8, wherein
an existing TCP (Transmission Control Protocol) connection couples the first node and the receiving node,
the vInit message is received from the first node via the existing TCP connection,
the updated vInit message is forwarded without the apparatus storing label switched path (LSP) specific information included in the updated vInit message, and
the requesting node and the target node do not have IP (Internet Protocol) connectivity with one another.

10. The apparatus of claim 8, wherein the vInit message processor is further configured to:
extract a stack of one or more relay labels from the vInit message, in response to a determination that the destination address is owned by the receiving node, wherein
the receiving node is determined to be the target node.

11. The apparatus of claim 10, wherein the vInit message processor is further configured to:
store the stack of one or more relay labels, and
push an outer label on the stack of one or more relay labels, wherein
the outer label is an outgoing label that the target node uses to reach the first node, and
the stack of one or more relay labels and the outer label define a stitched point-to-point LSP (label switched path) from the target node to the requesting node.

12. The apparatus of claim 10, the apparatus further comprising:
a vInit message generator configured to
generate a responsive vInit message, and
transmit the responsive vInit message to the first node toward the requesting node, wherein
the vInit message received at the target node comprises a session ID (identifier) that identifies the vLDP session,
the responsive vInit message comprises the session ID, and
the responsive vInit message confirms that the request to establish the vLDP session is accepted.

13. The apparatus of claim 11, the apparatus further comprising:
a vLDP message generator configured to
generate a vLDP message,
impose the stack of one or more relay labels and the outer label onto the vLDP message, wherein
the stack of relay labels and the outer label are associated with the vLDP session, and
label-switch the vLDP message to the requesting node.

14. The apparatus of claim 13, wherein
the vLDP message comprises an LDP message defined by LDP protocol logic,
the target node is not directly connected to the requesting node, and
the target node treats the requesting node as a directly connected LDP neighbor.

15. A non-transitory computer readable storage medium configured to store program instructions that, when executed on a processor, are configured to cause the processor to:
detect receipt of a virtual Label Distribution Protocol initialization (vInit) message from a first node, wherein
the vInit message is received at a receiving node, and
the vInit message comprises a request to establish a virtual Label Distribution Protocol (vLDP) session between a requesting node in a first network segment and a target node in a second network segment;
determine whether a destination address of the vInit message is owned by the receiving node;
insert a relay label into the vInit message to produce an updated vInit message;
in response to a determination that the destination address is not owned by the receiving node,
determine that the receiving node comprises a relay node,
determine that the relay node comprises a border label switching router (LSR), wherein the border LSR is coupled to at least the first network segment and the second network segment, wherein the border LSR comprises a protected node, and
the relay label is an outgoing label that the relay node uses to reach the first node; and
forward the updated vInit message toward the destination address, wherein the protected node determines an upstream neighbor comprising a point of local repair and advertises an address of the point of local repair in a multipoint Label Distribution Protocol (mLDP) notification message to a downstream neighboring node.

16. The non-transitory computer readable storage medium of claim 15, wherein
an existing TCP (Transmission Control Protocol) connection couples the first node and the receiving node,
the vinit message is received from the first node via the existing TCP connection,
the relay node forwards the updated vinit message without storing label switched path (LSP) specific information included in the updated vinit message, and
the requesting node and the target node do not have IP (Internet Protocol) connectivity with one another.

17. The non-transitory computer readable storage medium of claim 15, wherein the program instructions are further configured to cause the processor to:
extract a stack of one or more relay labels from the vinit message, in response to a determination that the destination address is owned by the receiving node, wherein
the receiving node is determined to be the target node.

18. The non-transitory computer readable storage medium of claim 17, wherein the program instructions are further configured to cause the processor to:
store the stack of one or more relay labels; and
push an outer label on the stack of one or more relay labels, wherein
the outer label is an outgoing label that the target node uses to reach the first node, and
the stack of one or more relay labels and the outer label define a stitched point-to-point LSP (label switched path) from the target node to the requesting node.

19. The non-transitory computer readable storage medium of claim 17, wherein the program instructions are further configured to cause the processor to:
transmit a responsive vInit message to the first node toward the requesting node, wherein
the vInit message received at the target node comprises a session ID (identifier) that identifies the vLDP session,
the responsive vInit message comprises the session ID, and
the responsive vInit message confirms that the request to establish the vLDP session is accepted.

20. The non-transitory computer readable storage medium of claim 18, wherein the program instructions are further configured to cause the processor to:
generate a vLDP message;
impose the stack of one or more relay labels and the outer label onto the vLDP message, wherein
the stack of relay labels and the outer label are associated with the vLDP session; and
label-switch the vLDP message to the requesting node.

21. The non-transitory computer readable storage medium of claim 20, wherein
the vLDP message comprises an LDP message defined by LDP protocol logic,
the target node is not directly connected to the requesting node, and
the target node treats the requesting node as a directly connected LDP neighbor.

* * * * *